United States Patent
Max et al.

(10) Patent No.: US 12,026,282 B2
(45) Date of Patent: Jul. 2, 2024

(54) METHOD, COMPUTER PROGRAM, AND DEVICE FOR PROCESSING DATA RECORDED BY A MOTOR VEHICLE, AND FOR PROVIDING PARAMETERS FOR SUCH PROCESSING

(71) Applicant: Volkswagen Aktiengesellschaft, Wolfsburg (DE)

(72) Inventors: Stephan Max, Gifhorn (DE); Martin Wegner, Braunschweig (DE); Sabina Alazzawi, Munich (DE); Richard Niestroj, Munich (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 332 days.

(21) Appl. No.: 17/624,389

(22) PCT Filed: Jun. 23, 2020

(86) PCT No.: PCT/EP2020/067453
§ 371 (c)(1),
(2) Date: Jan. 3, 2022

(87) PCT Pub. No.: WO2021/001207
PCT Pub. Date: Jan. 7, 2021

(65) Prior Publication Data
US 2022/0358248 A1  Nov. 10, 2022

(30) Foreign Application Priority Data
Jul. 2, 2019  (DE) .................. 10 2019 209 711.1

(51) Int. Cl.
*G06F 21/62* (2013.01)
(52) U.S. Cl.
CPC .............................. *G06F 21/6254* (2013.01)

(58) Field of Classification Search
CPC ... G06F 21/6254; H04W 4/029; H04W 12/02; G08G 1/0112; G08G 1/012
See application file for complete search history.

(56) References Cited

U.S. PATENT DOCUMENTS 8,255,393 B1    8/2012   Yu et al. .................. 707/724
8,611,650 B2   12/2013   Klein et al. ............. 382/165
(Continued)

FOREIGN PATENT DOCUMENTS

| CN | 105871831 A | 8/2016 | ............ H04L 29/06 |
| DE | 102011106295 A1 | 1/2012 | ............ G08G 1/01 |

(Continued)

OTHER PUBLICATIONS

P. M. Wightman, M. A. Jimeno, D. Jabba and M. Labrador, "Matlock: A location obfuscation technique for accuracy-restricted applications," 2012 IEEE Wireless Communications and Networking Conference (WCNC), Paris, France, 2012, pp. 1829-1834, doi: 10.1109/WCNC.2012.6214082. (Year: 2012).*

(Continued)

*Primary Examiner* — Robert B Leung
(74) *Attorney, Agent, or Firm* — Slayden Grubert Beard PLLC

(57) ABSTRACT

The disclosure relates to a method for processing data recorded by a motor vehicle. In a first step, at least one set of parameters for a temporal and spatial obfuscation of the recorded data is received. An item of data recorded by a motor vehicle is additionally received. A temporal and spatial obfuscation is then applied to the received item of data using the at least one received set of parameters. The obfuscated item of data is finally forwarded for further processing. The obfuscation may take place within the motor vehicle or in a back end connected to the motor vehicle.

16 Claims, 4 Drawing Sheets

(56) References Cited

U.S. PATENT DOCUMENTS

| | | | |
|---|---|---|---|
| 8,711,688 B1 | 4/2014 | Smith et al. ................. 370/229 |
| 8,978,153 B1 | 3/2015 | Cuthbertson ................... 726/26 |
| 9,471,852 B1* | 10/2016 | Feris ........................ G06N 3/08 |
| 9,794,373 B1 | 10/2017 | Steinmetz |
| 10,032,368 B1 | 7/2018 | Thompson et al. |
| 10,311,446 B2* | 6/2019 | Prehofer ................ G06Q 10/10 |
| 10,679,077 B2 | 6/2020 | Kinoshita et al. |
| 10,846,428 B2 | 11/2020 | Max et al. |
| 11,868,479 B2 | 1/2024 | Lysecky et al. |
| 2002/0177950 A1 | 11/2002 | Davies ......................... 701/479 |
| 2005/0069138 A1 | 3/2005 | De Jong ....................... 380/278 |
| 2008/0027627 A1 | 1/2008 | Ikeda et al. .................... 701/117 |
| 2009/0157566 A1 | 6/2009 | Grush ........................... 705/400 |
| 2010/0079590 A1 | 4/2010 | Kuehnle et al. ............. 348/118 |
| 2012/0042046 A1 | 2/2012 | Petersen et al. ............. 709/219 |
| 2012/0121183 A1 | 5/2012 | Joshi ........................... 382/191 |
| 2012/0197873 A1* | 8/2012 | Uramoto ............ G08G 1/0141 |
| | | 707/E17.014 |
| 2013/0117830 A1 | 5/2013 | Erickson et al. ................. 726/6 |
| 2013/0335237 A1 | 12/2013 | Zarka et al. .................. 340/905 |
| 2015/0300835 A1 | 10/2015 | Fowe et al. ................... 701/410 |
| 2016/0065559 A1 | 3/2016 | Archer et al. .................... 726/8 |
| 2016/0104377 A1 | 4/2016 | French et al. ................ 701/117 |
| 2016/0150361 A1 | 5/2016 | Zhu et al. ................. 455/456.1 |
| 2016/0358349 A1 | 12/2016 | Dorum ......................... 345/440 |
| 2016/0364983 A1 | 12/2016 | Downs et al. ................ 701/119 |
| 2017/0010618 A1 | 1/2017 | Shashua et al. ................ 701/26 |
| 2017/0083708 A1 | 3/2017 | Braghin et al. ................ 726/26 |
| 2017/0118634 A1 | 4/2017 | Xiong et al. .................. 455/411 |
| 2017/0358204 A1 | 12/2017 | Modica et al. |
| 2017/0366513 A1* | 12/2017 | Kumaran ............ H04L 63/0421 |
| 2018/0173895 A1 | 6/2018 | Max et al. |
| 2018/0173970 A1 | 6/2018 | Bayer et al. |
| 2018/0261021 A1 | 9/2018 | Rosenbaum |
| 2018/0315180 A1 | 11/2018 | Townsend |
| 2019/0017832 A1 | 1/2019 | Busser |
| 2019/0051062 A1* | 2/2019 | Mueck ................... G07C 5/008 |
| 2019/0051172 A1 | 2/2019 | Stenneth et al. |
| 2019/0086925 A1 | 3/2019 | Fan et al. |
| 2019/0156062 A1 | 5/2019 | Busser |
| 2019/0196481 A1 | 6/2019 | Tay et al. |
| 2019/0258260 A1 | 8/2019 | Sunil Kumar et al. |
| 2019/0271551 A1 | 9/2019 | Stess |
| 2019/0272389 A1 | 9/2019 | Viente et al. |
| 2019/0272746 A1 | 9/2019 | Aguiar et al. |
| 2020/0042620 A1 | 2/2020 | Aggarwal et al. |
| 2020/0132476 A1 | 4/2020 | Roeth et al. |
| 2020/0271458 A1 | 8/2020 | Berry et al. |
| 2020/0379122 A1 | 12/2020 | Tontiruttananon et al. |
| 2020/0386569 A1 | 12/2020 | Stajner et al. |
| 2020/0387632 A1 | 12/2020 | Mcerlean |
| 2021/0027117 A1 | 1/2021 | Mcgavran et al. |
| 2021/0075775 A1 | 3/2021 | Cheng et al. |
| 2021/0176597 A1 | 6/2021 | Li et al. |
| 2022/0116742 A1 | 4/2022 | Tal et al. |
| 2022/0120585 A1 | 4/2022 | Max et al. |
| 2022/0136846 A1 | 5/2022 | Bhorkar et al. |

FOREIGN PATENT DOCUMENTS

| | | | |
|---|---|---|---|
| DE | 102013204128 A1 | 9/2014 | ............. G06F 15/16 |
| DE | 102014208465 A1 | 11/2015 | ............. G08G 1/01 |
| DE | 102016200855 B3 | 9/2016 | ............. G01C 21/14 |
| DE | 102015213393 A1 | 1/2017 | ............. G08G 1/01 |
| DE | 102015216414 A1 | 3/2017 | ............. H04L 9/00 |
| DE | 102016110331 B3 | 6/2017 | ............. G08G 1/01 |
| DE | 102016225287 A1 | 6/2018 | ............. G08G 1/01 |
| DE | 102018006281 A1 | 2/2019 | ............. B06W 50/02 |
| DE | 102019209226 A1 | 12/2020 | ............. G07C 5/08 |
| DE | 102019209711 A1 | 1/2021 | ............. G07C 5/08 |
| EP | 2423885 A1 | 2/2012 | ............. G07B 15/06 |
| EP | 2827547 A1 | 1/2015 | ............. H04L 29/06 |
| WO | 2020/259932 A1 | 12/2020 | ............. G07C 5/00 |
| WO | 2020/259933 A1 | 12/2020 | ............. G05D 1/00 |
| WO | 2021/001207 A1 | 1/2021 | ............. G08G 1/01 |

OTHER PUBLICATIONS

U.S. Non-Final Office Action, U.S. Appl. No. 17/623,004, 23 pages.
Gruteser, Marco et al., "Anonymous Usage of Location-Based Services Through Spacial and Temporal Cloaking," Proceedings of MobiSys 2003: The First International Conference on Mobile Systems, Applications, and Services, pp. 31-42, May 5, 2003.
Gedik, Buğra et al., "Location Privacy in Mobile Systems: A Personalized Anonymization Model," Proceedings of the 25th IEEE International Conference on Distributed Computing Systems, pp. 620-629, Jun. 6, 2005.
Mascetti, Sergio et al., "κ-Anonymity in Databases with Timestamped Data," IEEE 13th International Symposium on Temporal Representation and Reasoning (TIME'06), pp. 177-186, 2006.
Gedik, Bura et al., "Protecting Location Privacy with Personalized κ-Anonymity: Architecture and Algorithms," IEEE Transactions on Mobile Computing, vol. 7, No. 1, 18 pages, Jan. 1, 2008.
German Office Action, Application No. 102019209485.6, 10 pages, Jan. 14, 2020.
German Office Action, Application No. 102019209711.1, 6 pages, Jun. 10, 2020.
International Search Report and Written Opinion, Application No. PCT/EP2020/064084, 7 pages, Aug. 14, 2020.
International Search Report and Written Opinion, Application No. PCT/EP2020/064087, 11 pages, Sep. 14, 2020.
International Search Report and Written Opinion, Application No. PCT/EP2020/067453, 10 pages, Oct. 5, 2020.
U.S. Non-Final Office Action, U.S. Appl. No. 17/623,160, 31 pages, Jan. 18, 2024.

* cited by examiner

METHOD, COMPUTER PROGRAM, AND DEVICE FOR PROCESSING DATA RECORDED BY A MOTOR VEHICLE, AND FOR PROVIDING PARAMETERS FOR SUCH PROCESSING

CROSS-REFERENCE TO RELATED APPLICATIONS

This application claims priority to German Patent Application No. DE 10 2019 209 711.1, filed Jul. 2, 2019 with the German Patent and Trademark Office. The contents of the aforesaid Patent Application are incorporated herein for all purposes.

TECHNICAL FIELD

The present invention relates to a method, a computer program with instructions, and a device for processing data recorded by a motor vehicle. The invention additionally relates to a method, a computer program with instructions, and a device for providing parameters for the processing of data recorded by a motor vehicle. The invention further relates to a motor vehicle and a back end in which a method according to the invention or a device according to the invention is used.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In modern motor vehicles, a variety of data is collected. With increasing vehicle connectivity, there is an interest in using the data collected by a vehicle for further evaluation. For this purpose, data may be taken from the motor vehicle and fed to a back end. For example, data may be extracted from vehicle sensors in a location- or time-dependent manner for applications relating to weather forecasts, parking space occupancy, or traffic flow data. In the back end, the data are then combined with other data on a map and fed back to the functions using said data.

One important application scenario for data collection is the creation of a database for anonymized swarm data for researching, developing, and safeguarding automatic driving functions. Highly automated vehicles are expected to cope with a plethora of different and sometimes complex road traffic scenarios without there being an accident. However, since the majority of these scenarios occur only very rarely, testing in real road traffic is both time- and cost-intensive. A substantial database is therefore required for the development of automatic driving functions to series maturity in order to safeguard the algorithms, as this may no longer be achieved by means of classic endurance test runs. Therefore, a data pool is required which has data from as wide a variety of challenging traffic situations as possible, ideally supplied from real driving situations, by means of which data pool the algorithms may be trained and continuously improved such that the vehicles may make appropriate decisions and act safely in road traffic in all eventualities.

However, the data taken from a vehicle may sometimes provide an indication of the personal or material circumstances of an identified or at least identifiable natural person, for example the driver of the motor vehicle.

Such collection and use of the data is generally only possible with a declaration of consent of the driver, as per applicable data protection laws. Although consumers today, in particular in the software field, are quite familiar with accepting conditions of use and granting approval for the evaluation of data, this is not very common in the automotive sector. It is therefore not always easy to obtain a declaration of consent for the use of the data. In addition, software updates may potentially require a new declaration of consent to be obtained from the user, which could become a nuisance for the user over time.

In order to ensure the protection of data, the data may be subjected to different anonymization methods. The aim of these anonymization methods is to conceal the identity of the data originator in an anonymization group.

In one anonymization approach, the data are segmented. In this case, the data of a vehicle are split into different segments during travel. In this way, it is ensured that potential data users cannot obtain the full data set relating to the vehicle's journey. The entire distance is generally only traveled by very few vehicles, and potentially only one individual vehicle. However, the individual segments are traveled by many vehicles.

In another anonymization approach, the data are obfuscated in terms of location or time. In this case, the data are randomly additively shifted in space or time. In this way, identification of the original vehicle is only possible with respect to a group of vehicles.

Although methods for spatial and temporal obfuscation are well suited for concealing the identity of the data originator within an anonymization group, the data user must always compromise on the extent of the spatial and temporal obfuscation.

SUMMARY

A need exists to provide solutions for anonymizing data recorded by a motor vehicle that allow for a temporal and spatial obfuscation of the recorded data that is less subjected to compromise.

The need is addressed by a method, by a computer program, and by a device according to the independent claims. Embodiments of the invention are described in the dependent claims, the following description, and the drawings.

DESCRIPTION

Figure 1:
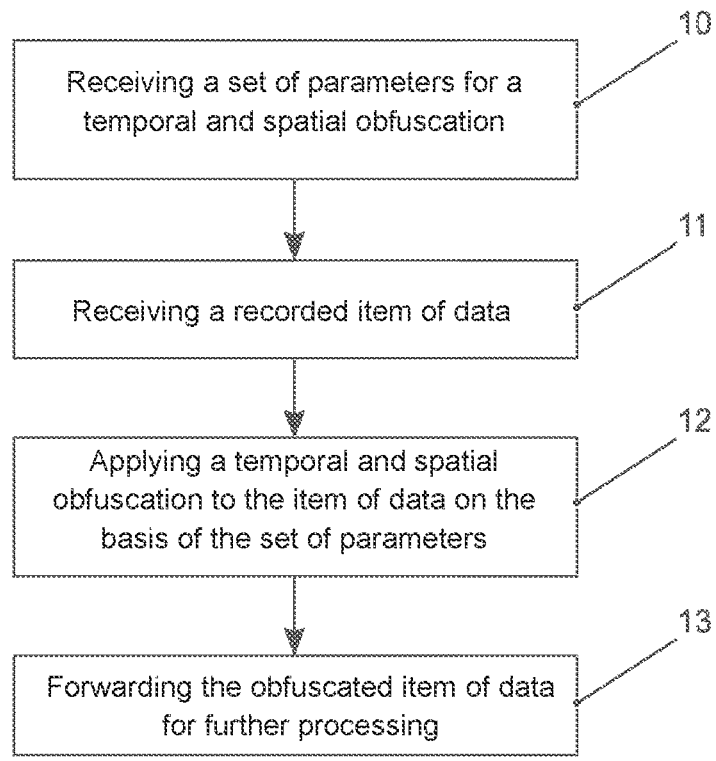
FIG. 1 schematically shows an exemplary method for processing data recorded by a motor vehicle.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for processing data recorded by a motor vehicle comprises the steps of:
  receiving at least one set of parameters for a temporal and spatial obfuscation of the recorded data from a data user;
  receiving an item of data recorded by a motor vehicle;
  applying a temporal and spatial obfuscation to the received item of data using one of the received sets of parameters; and
  forwarding the obfuscated item of data for further processing.

In some embodiments, a computer program contains instructions which, when executed by a computer, prompt the computer to carry out the following steps for processing data recorded by a motor vehicle:
  receiving at least one set of parameters for a temporal and spatial obfuscation of the recorded data from a data user;
  receiving an item of data recorded by a motor vehicle;
  applying a temporal and spatial obfuscation to the received item of data using one of the received sets of parameters; and
  forwarding the obfuscated item of data for further processing.

The term "computer" is to be understood broadly. In particular, it may also include control units, workstations, and other processor-based data processing devices.

The computer program may for example be provided for electronic retrieval or be stored on a computer-readable storage medium.

In some embodiments, a device for processing data recorded by a motor vehicle comprises:
  an input for receiving at least one set of parameters for a temporal and spatial obfuscation of the recorded data and for receiving an item of data recorded by a motor vehicle from a data user;
  an anonymization unit for applying a temporal and spatial obfuscation to the received item of data using one of the received sets of parameters; and
  an output for forwarding the obfuscated item of data for further processing.

From the point of view of the data originator, the anonymization method does not function with fixed settings for the temporal and spatial obfuscation, but rather allows for adjustable mixed anonymization. For this purpose, previously received sets of parameters that allow for situation-dependent adaptation of the anonymization settings are used. In this way, quick recognition of events in the recorded data as well as subsequent precise spatial detection of said events are possible.

In some embodiments, the method for providing parameters for the processing of data recorded by a motor vehicle comprises the steps of:
  providing at least one set of parameters for a temporal and spatial obfuscation of the recorded data; and
  transmitting the at least one set of parameters to a device for processing data recorded by a motor vehicle.

In some embodiments, a computer program contains instructions which, when executed by a computer, prompt the computer to carry out the following steps for providing parameters for the processing of data recorded by a motor vehicle:
  providing at least one set of parameters for a temporal and spatial obfuscation of the recorded data; and
  transmitting the at least one set of parameters to a device for processing data recorded by a motor vehicle.

The term "computer" is to be understood broadly. In particular, it may also include control units, workstations, and other processor-based data processing devices.

The computer program may for example be provided for electronic retrieval or be stored on a computer-readable storage medium.

In some embodiments, a device for providing parameters for the processing of data recorded by a motor vehicle comprises:
  an input for receiving at least one set of parameters for a temporal and spatial obfuscation of the recorded data and for receiving an item of data recorded by a motor vehicle;
  a parameter determination unit for determining at least one set of parameters for a temporal and spatial obfuscation of the recorded data; and
  a transmission unit for transmitting the at least one set of parameters to a device for processing data recorded by a motor vehicle.

From the point of view of the data user, this is not restricted to data that were anonymized with temporal and spatial obfuscation settings subjected to compromise. Rather, the data user may prompt the data originator to use an adapted set of parameters for the anonymization depending on the situation or event. For this purpose, the desired set of parameters may for example be transmitted to the data originator. Alternatively, it is also possible to merely transmit a request to the data originator to use a set of parameters already available to the data originator for the anonymization. In this way, the data user is always able to change the sets of parameters for the obfuscation algorithm.

In some embodiments, the at least one set of parameters comprises specifications as to which position or which area the at least one set of parameters may be applied for. For example, it is possible to adapt the set of parameters not only for the obfuscation filter as a whole but rather precisely for specific positions or areas. This makes it possible, for example, to apply a slow and precise obfuscation, i.e., a large-scale temporal obfuscation in combination with a small-scale spatial obfuscation, to a previously identified site of an accident, without thereby causing a large-scale temporal obfuscation in other regions.

In some embodiments, the at least one set of parameters comprises specifications as to which type of recorded data the at least one set of parameters may be applied for. This makes it possible to only adapt the anonymization for specific data sets or identified events. For example, a fast and imprecise obfuscation may be permitted for an identified emergency vehicle, i.e., a small-scale temporal obfuscation in combination with a large-scale spatial obfuscation.

In some embodiments, a selection is made between two or more sets of parameters for the temporal and spatial obfuscation of the recorded data. Another possibility is an obfuscation with multiple sets of parameters that may be selected at random. It may be beneficial if, for example, 50% of the data are anonymized with a large-scale temporal obfuscation in combination with a small-scale spatial obfuscation, whereas the remaining 50% of the data are anonymized with a small-scale temporal obfuscation in combination with a large-scale spatial obfuscation. This makes it statistically certain that new events or fundamental changes to events, for example, are identified quickly, while known data may be measured more accurately over time on account of the slow detection. This approach of using multiple sets of parameters is helpful, in particular, if a precise adaptation of the sets of parameters is not possible or not possible with sufficient certainty. Of course, a combination of the methods is also possible, i.e., the use of multiple sets of parameters with adaptable, precisely executed parameters. The percentage distribution used is for example adaptable depending on the application.

In some embodiments, firstly, a first set of parameters that causes an obfuscation of the recorded data involving a small-scale temporal obfuscation in combination with a large-scale spatial obfuscation is transmitted. Then, in response to an event being identified in the obfuscated data, a second set of parameters that causes an obfuscation of the recorded data involving a large-scale temporal obfuscation in combination with a small-scale spatial obfuscation is transmitted. In this way, it is possible, for example, to detect a traffic jam or the end of a traffic jam within approximately 60 seconds to the nearest 5 km. As soon as this is known to the data user, said data user may change the parameters and thus locate the end of the traffic jam to the nearest 500 m, for example. However, this is done with a time offset. The data user is thus able to quickly warn traffic or to divert traffic over a large area by means of navigation instructions. In the long term, the data user will also be able to warn drivers of the exact point at which the traffic jam ends.

For example, a method or a device according to the teachings herein may be used in an autonomously or manually controlled vehicle, in particular a motor vehicle. Alternatively, the solution may also be used in a back end to which the data are transmitted from the vehicle.

Additional features of the present invention will become apparent from the following description and the appended claims in conjunction with the FIGS.

In order to improve understanding of the principles of the present invention, further embodiments will be explained in detail in the following based on the FIGS. It should be understood that the invention is not limited to these embodiments and that the features described may also be combined or modified without departing from the scope of protection of the invention as defined in the appended claims.

FIG. 1 schematically shows a method for processing data recorded by a motor vehicle. In a first step, at least one set of parameters for a temporal and spatial obfuscation of the recorded data is received 10 from a data user. Additionally, an item of data recorded by a motor vehicle is received 11. Subsequently, a temporal and spatial obfuscation is applied 12 to the received item of data using one of the received sets of parameters. Finally, the obfuscated item of data is forwarded 13 for further processing. The set of parameters may comprise specifications as to which position or which area it may be applied for. The set of parameters may also comprise specifications as to which type of recorded data it may be applied for. These specifications are for example taken into account by the data originator if a set of parameters is to be used for the obfuscation. Alternatively, a selection between two or more sets of parameters is provided for the temporal and spatial obfuscation of the recorded data. A set of parameters may then be selected therefrom, for example at random, for the obfuscation.

Figure 2:
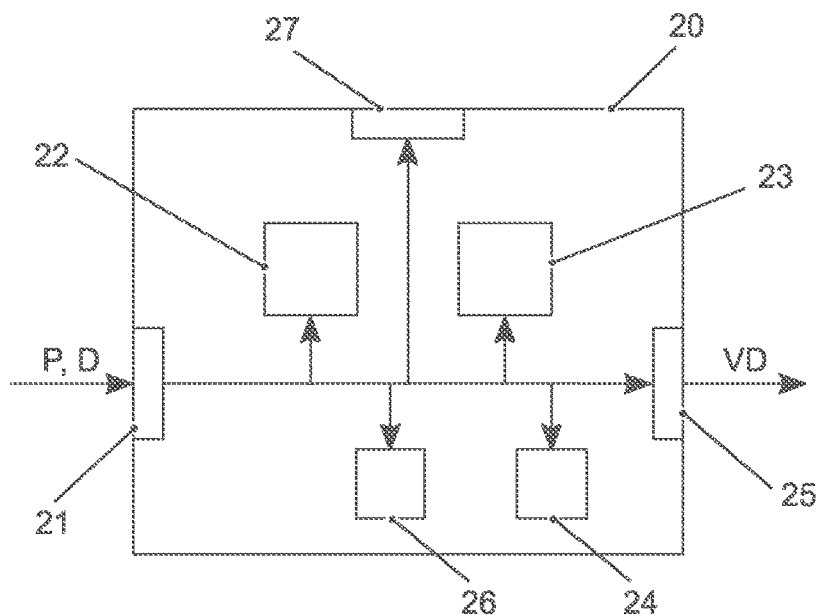
FIG. 2 shows a first embodiment of a device for processing data recorded by a motor vehicle.

FIG. 2 is a simplified schematic representation of a first embodiment of a device 20 for processing data D recorded by a motor vehicle. The device 20 comprises an input 21 for receiving at least one set of parameters P for a temporal and spatial obfuscation of the recorded data from a data user and for receiving an item of data D recorded by a motor vehicle. A data processing unit 22 determines the parameters required for a temporal and spatial obfuscation based on one of the sets of parameters P. An anonymization unit 23 then applies a temporal and spatial obfuscation to the received item of data D. Finally, the obfuscated item of data VD is forwarded for further processing via an output 25. The set of parameters P may comprise specifications as to which position or which area it may be applied for. The set of parameters P may additionally comprise specifications as to which type of recorded data it may be applied for. These specifications are for example taken into account by the data processing unit 22 if a set of parameters P is to be used for the obfuscation. Alternatively, a selection between two or more sets of parameters P is provided for the temporal and spatial obfuscation of the recorded data. A set of parameters P may then be selected therefrom, for example at random, for the obfuscation.

The data processing unit 22 and the anonymization unit 23 may be controlled by a control unit 24. Settings of the data processing unit 22, anonymization unit 23, or control unit 24 may be changed, if required, via a user interface 27. The data accumulating in the device 20 may be deposited in a memory 26 of the device 20 if required, for example for later evaluation or to be used by the components of the device 20. The data processing unit 22, anonymization unit 23, and control unit 24 may be designed as dedicated hardware, for example as integrated circuits. Of course, they may also be partially or fully combined or be implemented as software running on a suitable processor, for example a GPU. The input 21 and the output 25 may be implemented as separate interfaces or as a combined bidirectional interface.

Figure 3:
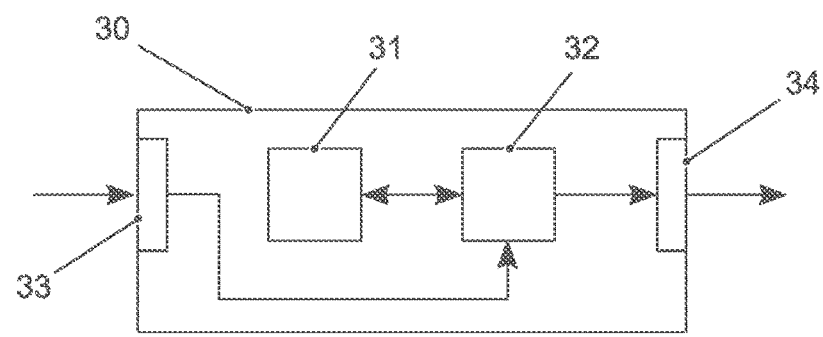
FIG. 3 shows a second embodiment of a device for processing data recorded by a motor vehicle.

FIG. 3 is a simplified schematic representation of a second embodiment of a device 30 for processing data recorded by a motor vehicle. The device 30 comprises a processor 32 and a memory 31. By way of example, the device 30 is a computer, a workstation, or a control unit. Instructions which, when executed by the processor 32, prompt the device 30 to carry out the steps according to any one of the methods described are stored in the memory 31. The instructions stored in the memory thus constitute a program that may be executed by the processor 32 and that implements the method according to the teachings herein. The device has an input 33 for receiving information. Data generated by the processor 32 are provided via an output 34. Said data may also be stored in the memory 31. The input 33 and the output 34 may be merged into a bidirectional interface.

The processor 32 may comprise one or more processor units, for example microprocessors, digital signal processors, or combinations thereof.

The memories 26, 31 of the embodiments described may have volatile and/or non-volatile memory regions and comprise a wide variety of storage units and storage media, for example hard drives, optical storage media, or semiconductor memories.

The two embodiments of the device may be integrated in the motor vehicle or be part of a back end that is connected to the motor vehicle.

Figure 4:
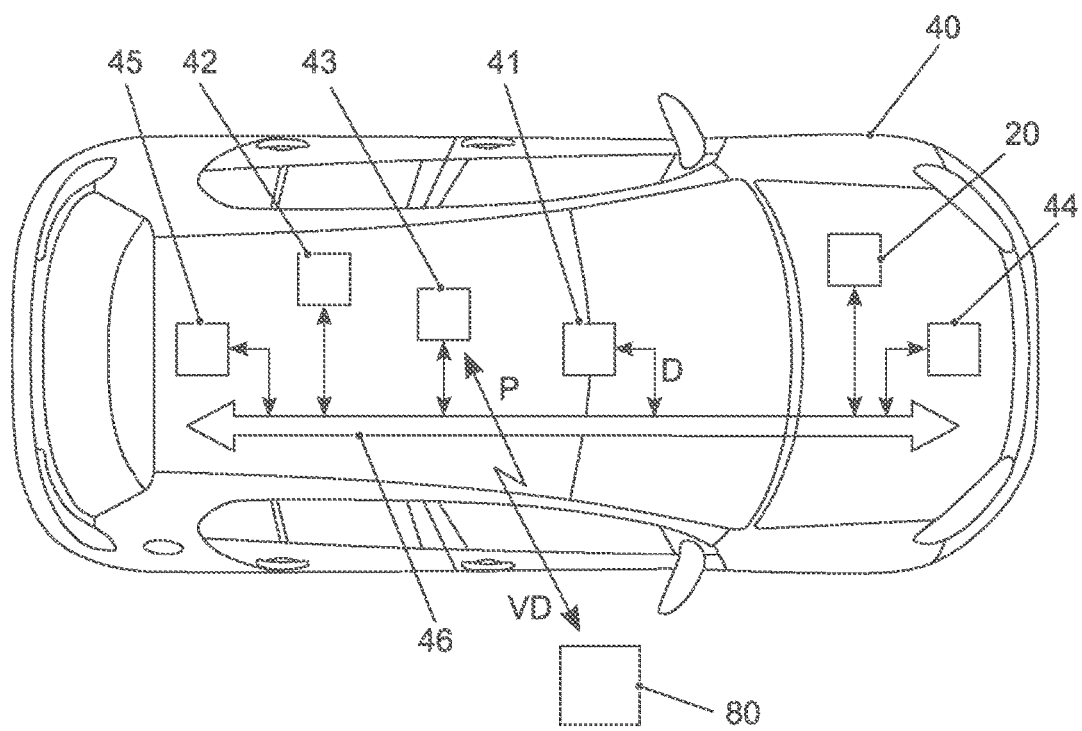
FIG. 4 is a schematic representation of a motor vehicle in which an embodiment is implemented.

FIG. 4 is a schematic representation of a motor vehicle 40 in which a solution according to the teachings herein is implemented. The motor vehicle 40 comprises a sensor system 41 by means of which data D may be recorded, for example a traffic situation. Other components of the motor vehicle 40 are a navigation system 42, a data transmission unit 43, and a series of assistance systems 44, of which one is shown by way of example. By means of the data transmission unit 43, a connection to a back end 80 may be established, in particular for transmitting recorded data and for receiving at least one set of parameters P. In this exemplary embodiment, a device 20 for processing the recorded data D provides for temporal and spatial obfuscation of the data using the at least one received set of parameters, such that obfuscated data VD are transmitted to the back end 80. Alternatively, the obfuscation of the data D may not take place until said data are in the back end 80, before they are provided thereby to a data user. In this case, the back end 80 receives the at least one set of parameters P. A memory is present for storing data. The data exchange between the various components of the motor vehicle 40 takes place via a network 46.

Figure 5:
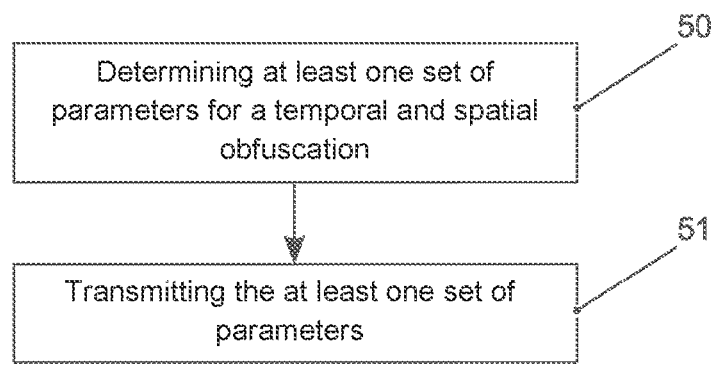
FIG. 5 schematically shows an exemplary method for providing parameters for the processing of data recorded by a motor vehicle.

FIG. 5 schematically shows a method for providing parameters for the processing of data recorded by a motor vehicle. In a first step, at least one set of parameters is determined 50 for a temporal and spatial obfuscation of the recorded data. Said set of parameters is then transmitted 51 to a device for processing data recorded by a motor vehicle. The set of parameters may comprise specifications as to which position or which area it may be applied for. The set of parameters may additionally comprise specifications as to which type of recorded data it may be applied for. In addition, two or more sets of parameters may be transmitted for the temporal and spatial obfuscation of the recorded data. The data originator may then randomly select a set of parameters therefrom for the obfuscation.

Figure 6:
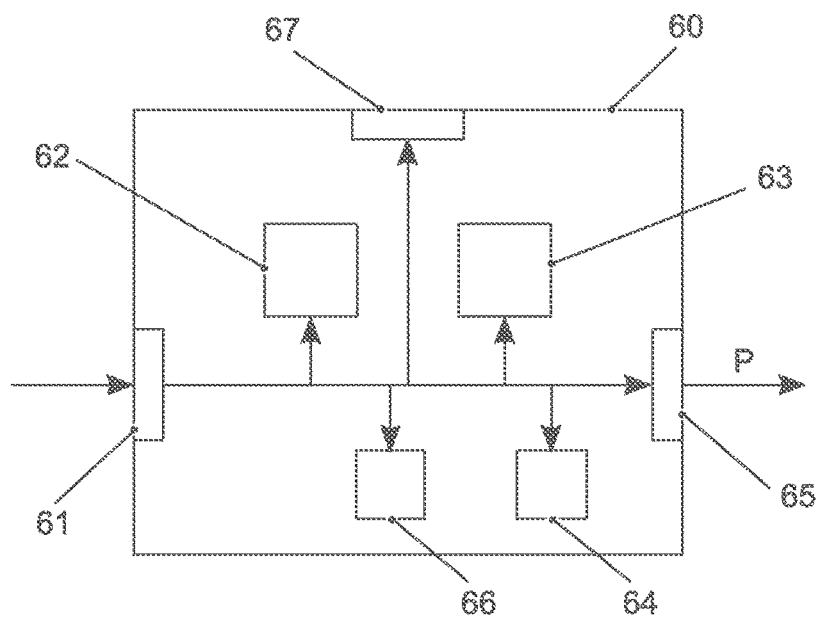
FIG. 6 shows a first embodiment of a device for providing parameters for the processing of data recorded by a motor vehicle.

FIG. 6 shows a first embodiment of a device 60 for providing parameters for the processing of data recorded by a motor vehicle. The device 60 comprises an input 61, for example for receiving requirements of a data user with regard to the obfuscation of recorded data. A parameter determination unit 62 determines at least one set of parameters P for a temporal and spatial obfuscation of the recorded data. Said at least one set of parameters P is then transmitted by a transmission unit 63 to a device 20 for processing data recorded by a motor vehicle. The set of parameters P may comprise specifications as to which position or which area it may be applied for. The set of parameters P may additionally comprise specifications as to which type of recorded data it may be applied for. In addition, two or more sets of parameters P may be transmitted for the temporal and spatial obfuscation of the recorded data. The device 20 may then randomly select a set of parameters P therefrom for the obfuscation.

The parameter determination unit 62 and the transmission unit 63 may be controlled by a control unit 64. Settings of the parameter determination unit 62, transmission unit 63, or control unit 64 may be changed, if required, via a user interface 67. The data accumulating in the device 60 may be deposited in a memory 66 of the device 60 if required, for example for later evaluation or to be used by the components of the device 60. The parameter determination unit 62, transmission unit 63, and control unit 64 may be designed as dedicated hardware, for example as integrated circuits. Of course, they may also be partially or fully combined or be implemented as software running on a suitable processor, for example a GPU. The input 61 and the output 65 may be implemented as separate interfaces or as a combined bidirectional interface.

Figure 7:
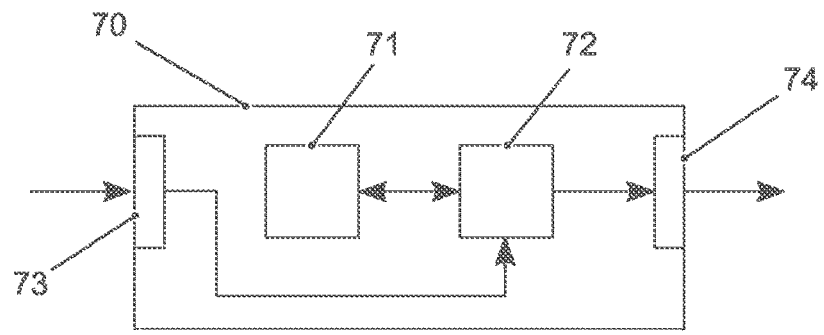
FIG. 7 shows a second embodiment of a device for providing parameters for the processing of data recorded by a motor vehicle.

FIG. 7 shows a second embodiment of a device 70 for providing parameters for the processing of data recorded by a motor vehicle. The device 70 comprises a processor 72 and a memory 71. By way of example, the device 70 is a computer or a workstation. Instructions which, when executed by the processor 72, prompt the device 70 to carry out the steps according to any one of the methods described are stored in the memory 71. The instructions stored in the memory 71 thus constitute a program that may be executed by the processor 72 and that implements the method according to the teachings herein. The device has an input 73 for receiving information. Data generated by the processor 72 are provided via an output 74. Said data may also be stored in the memory 71. The input 73 and the output 74 may be merged into a bidirectional interface.

The processor 72 may comprise one or more processor units, for example microprocessors, digital signal processors, or combinations thereof.

The memories 66, 71 of the embodiments described may have volatile and/or non-volatile memory regions and comprise a wide variety of storage units and storage media, for example hard drives, optical storage media, or semiconductor memories.

Figure 8:
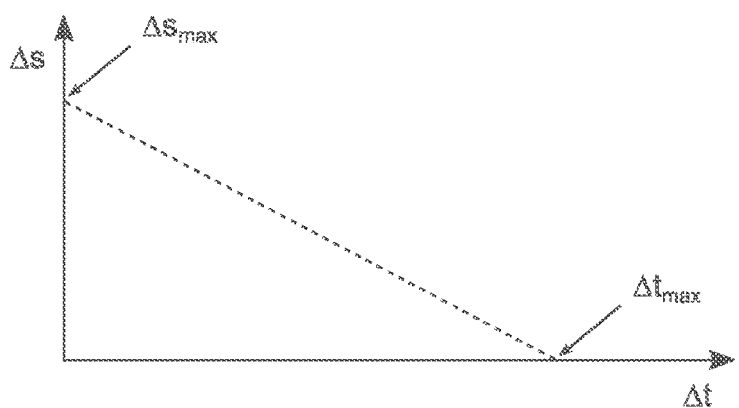
FIG. 8 illustrates exemplary variants of the obfuscation with constant boundary conditions.

FIG. 8 illustrates variants of the obfuscation with constant boundary conditions. The possible combinations of temporal obfuscation and spatial obfuscation for a given level of anonymization are plotted here. As shown in the FIG., the magnitude $\Delta s$ of the spatial obfuscation is greater the lower the magnitude $\Delta t$ of the temporal obfuscation, and vice versa. A minimal temporal obfuscation requires a maximal spatial obfuscation, whereas a minimal spatial obfuscation requires a maximal temporal obfuscation. This results in the data user always having to compromise with regard to the obfuscation.

Figure 9:
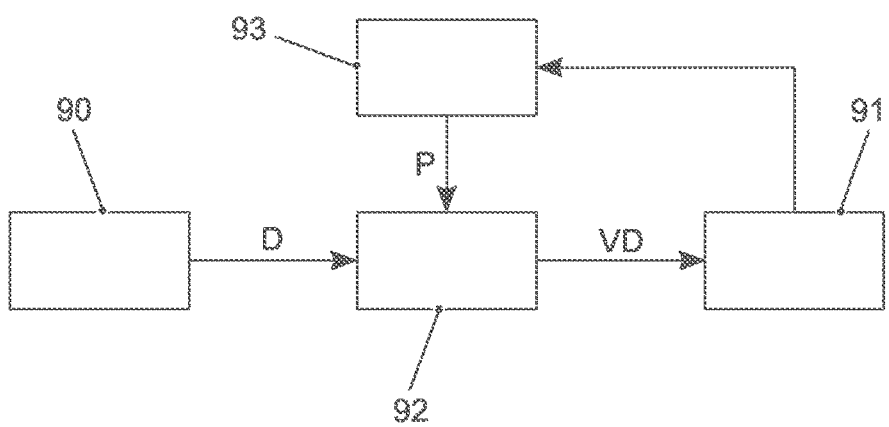
FIG. 9 schematically shows an embodiment of a system design.

FIG. 9 schematically shows a system concept of the solution according to the teachings herein. A basic idea of the solution is that the data user 91 is always able, by means of a provision of parameters 93, to change the sets of parameters P of the obfuscation algorithm 92 that is applied to the data recorded by a data originator 90. In this way, the data user 91 may quickly read effects from the data, for example, but then specify them more precisely afterward.

By way of example, it is therefore possible to detect a traffic jam or the end of a traffic jam within approximately 60 seconds to the nearest 5 km. As soon as this is known to the data user 91, said data user may change the parameters and thus locate the end of the traffic jam to the nearest 500 m, for example. However, this is done with a time offset of 600 seconds. The data user 91 is thus able to quickly warn traffic or to divert traffic over a large area by means of navigation instructions. In the long term, the data user will also be able to warn drivers of the exact point at which the traffic jam ends.

It is possible to adapt the set of parameters P not only for the obfuscation algorithm 92 as a whole but also precisely for specific positions or areas or for specific data sets or identified events. This makes it possible to apply a slow and precise obfuscation, i.e. a large-scale temporal obfuscation in combination with a small-scale spatial obfuscation, to a previously identified end point of a traffic jam. Equally, a fast and imprecise obfuscation may be permitted for an identified emergency vehicle, i.e. a small-scale temporal obfuscation in combination with a large-scale spatial obfuscation.

Another possibility is an obfuscation with multiple sets of parameters P that are selected at random. It may be beneficial if, for example, 50% of the data are anonymized with a large-scale temporal obfuscation in combination with a small-scale spatial obfuscation, whereas the remaining 50% of the data are anonymized with a small-scale temporal obfuscation in combination with a large-scale spatial obfuscation. This makes it statistically certain that new events or fundamental changes to events, for example, are identified quickly, while known data may be measured more accurately over time on account of the slow detection. This approach of using multiple sets of parameters P is beneficial in particular, if a precise adaptation of the sets of parameters P is not possible or not possible with sufficient certainty.

One possible application scenario for obfuscation with multiple sets of parameters P is the identification of an icy road. For this application scenario, 30% of the measurements, for example, may be obfuscated by means of spatial blurring of 5 km and temporal blurring of 1 min. As such, icy regions may be detected quickly. The warnings are therefore provided quickly, but are very imprecise from a spatial point of view. In contrast, 70% of the measurements are obfuscated with spatial blurring of 250 m and temporal blurring of 20 min. As such, the boundaries of the icy regions on the road may be accurately identified. The warnings are therefore accurate, but very sluggish.

The associated set of parameters P or parameter matrix is as follows:

[30%, 5 km, 1 min; 70%, 250 m, 20 min].

Of course, a combination of the methods is also possible, i.e. the use of multiple sets of parameters P with adaptable, precisely executed parameters.

LIST OF REFERENCE NUMERALS

10 Receiving a set of parameters for a temporal and spatial obfuscation
11 Receiving a recorded item of data
12 applying a temporal and spatial obfuscation to the item of data on the basis of the set of parameters
13 Forwarding the obfuscated item of data for further processing
20 Device
21 Input
22 Data processing unit
23 Anonymization unit
24 Control unit
25 Output
26 Memory
27 User interface
30 Device
31 Memory
32 Processor
33 Input
34 Output
40 Motor vehicle
41 Sensor system
42 Navigation system
43 Data transmission unit
44 Assistance system
45 Memory
46 Network
50 Determining at least one set of parameters for a temporal and spatial obfuscation
51 Transmitting the at least one set of parameters
60 Device
61 Input
62 Parameter determination unit
63 Transmission unit
64 Control unit
65 Output
66 Memory
67 User interface
70 Device
71 Memory
72 Processor
73 Input
74 Output
80 Back end
90 Data originator
91 Data user
92 Obfuscation algorithm
93 Provision of parameters
D Item of data
$\Delta s$ Magnitude of the spatial obfuscation
$\Delta s_{max}$ Maximal spatial obfuscation
$\Delta t$ Magnitude of the temporal obfuscation
$\Delta t_{max}$ Maximal temporal obfuscation
p Set of parameters
VD Obfuscated item of data The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for processing data recorded by a motor vehicle, comprising:
receiving two or more sets of temporal and spatial obfuscation parameters from a data user;
automatically receiving data recorded by a sensor of the motor vehicle;
automatically applying a temporal and spatial obfuscation to the received data using the two or more received sets of parameters, wherein the two or more sets of parameters are used such that a predefined proportion of the data is obfuscated with a large-scale temporal obfuscation in combination with a small-scale spatial obfuscation, whereas another portion of the data are obfuscated with a small-scale temporal obfuscation in combination with a large-scale spatial obfuscation; and
forwarding the obfuscated data to a data pool for an automatic driving function.

2. The method of claim 1, wherein the two or more sets of parameters comprises specifications, defining a vehicle position or an area around a vehicle position to which the two or more sets of parameters are applied to.

3. The method of claim 1, wherein the two or more sets of parameters comprises specifications as to which type of recorded data the two or more sets of parameters are applied to.

4. The method of claim 1, wherein the selection between the two or more sets of parameters is made at random.

5. The method of claim 1, wherein the predefined proportion is adapted depending on an application.

6. The method of claim 1, wherein, as an alternative to receiving the two or more sets of parameters, a request to use a pre-existing set of parameters for the temporal and spatial obfuscation of the recorded data is received.

7. The method of claim 1, wherein a first set of parameters that causes an obfuscation of the recorded data involving a small-scale temporal obfuscation in combination with a large-scale spatial obfuscation is transmitted, and in response to an event being identified in the obfuscated data, a second set of parameters that causes an obfuscation of the recorded data involving a large-scale temporal obfuscation in combination with a small-scale spatial obfuscation is transmitted.

8. A non-transitory storage medium with instructions which, when executed by a computer, prompt the computer to carry out the method of claim 1.

9. The method of claim 1, comprising training the automatic driving function using the data pool.

10. A device for processing data recorded by a motor vehicle, comprising:

- an input for receiving two or more sets of temporal and spatial obfuscation parameters, wherein a selection is made between the two or more sets of parameters and for receiving data recorded by the motor vehicle from a data user;
- an anonymization circuit for applying a temporal and spatial obfuscation to the received data using the two or more received sets of parameters, wherein the two or more sets of parameters are used such that a predefined proportion of the data is obfuscated with a large-scale temporal obfuscation in combination with a small-scale spatial obfuscation, whereas another portion of the data are obfuscated with a small-scale temporal obfuscation in combination with a large-scale spatial obfuscation; and
- an output for forwarding the obfuscated data to a data pool for an automatic driving function.

11. The motor vehicle, comprising the device of claim 10.

12. A back-end device for processing data recorded by the motor vehicle comprising the device of claim 10.

13. The method of claim 2, wherein the two or more sets of parameters comprises specifications as to which type of recorded data the two or more sets of parameters are applied to.

14. The motor vehicle, configured to carry out the method of claim 1.

15. A back-end device for processing data recorded by the motor vehicle, configured to carry out the method of claim 1.

16. The device of claim 10, comprising an automatic driving system, configured to use the data pool for training the automatic driving function.

* * * * *